United States Patent Office 3,659,016
Patented Apr. 25, 1972

3,659,016
SUBSTITUTED AMINO GUANIDINES AS
ANTI-OBESITY AGENTS
Robert E. Manning, Mountain Lakes, N.J., assignor to
Sandoz-Wander, Inc., Hanover, N.J.
No Drawing. Original application Aug. 11, 1970, Ser. No.
63,000. Divided and this application Apr. 26, 1971,
Ser. No. 137,693
Int. Cl. A61k 27/00
U.S. Cl. 424—326        5 Claims

ABSTRACT OF THE DISCLOSURE

Substituted aminoguanidines, e.g. γ-phenylpropyl-aminoguanidine hydronitrate, are useful as anti-obesity/anti-diabetic agents.

---

This is a division of application, Ser. No. 63,000 filed Aug. 11, 1970.

This invention relates to the pharmaceutical activity of substituted aminoguanidines. More particularly, this invention concerns the use of substituted aminoguanidines and acid addition salts thereof in the treatment of diabetes and obesity. The invention also relates to pharmaceutical composition containing the above compounds as an active ingredient thereof.

The active agents with which this invention is concerned may be represented by the following structural formula:

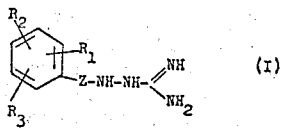

where

Z is —$(CH_2)_n$—, where $n$ is 2,3,4 or 5, or —O—$(CH_2)_m$—, where $m$ is 2,3, or 4,
$R_1$, $R_2$ or $R_3$ are independently hydrogen, halo having an atomic weight of 19 to 36, lower alkyl having 1 to 4 carbon atoms, e.g. methyl, ethyl, propyl, isopropyl, butyl or isobutyl, lower alkoxy having 1 to 4 carbon atoms, e.g. methoxy, ethoxy, propoxy, isopropoxy, butoxy, or isobutoxy or trifluoromethyl;

provided that there are no adjacent trifluoromethyl groups.

The compounds of Formula I above are known and may be prepared according to methods disclosed in the literature, e.g. by the method of Netherlands patent application 6505684, published Nov. 8, 1965, and Belgium patent application 629,613, published Oct. 21, 1963. Those compounds of Formula I, especially where $R_1$, $R_2$, and $R_3$ are not hydrogen, which are not specifically disclosed may be prepared according to analogous methods from known materials. The present invention contemplates the novel use of the compounds of Formula I and their salts in pharmaceutical applications.

As previously indicated, the compounds of Formula I are useful because they possess pharmacological activity in animals such as mammals, particularly as anti-diabetic and anti-obesity agents, as indicated by their activity in male Wistar rat which is dosed orally with the test compound after at least 20 hours of fasting. One hour after receiving the drug the animal is sacrificed and the upper small intestine is removed and washed with glucose-saline. A 5 cm. section of the intestine is everted so that the mucosal surface is on the outside. One end of the segment is tied off and the center of the sac so formed, is filled with oxygen saturated Kreb's biocarbonate buffer. The other end is then closed to form a sac and the sac is incubated in 10 ml. of oxygen saturated bicarbonate buffer for 60 minutes at 37° C. Both the outside and inside solutions contain initially 0.3% of glucose. At the end of the incubation time the glucose content of the outer (mucosal) and the inner (serosal) solution is determined using the standard autoanalyzer procedure. Similar preparations are prepared simultaneously from animals receiving the vehicle only to serve as controls. The percent inhibition of glucose transport caused by the drug is calculated from the formula.

$$\text{Percent } I = 100 - \left(\frac{ST-MT}{SC-MC} \times 100\right)$$

where

I equals inhibition
S equals glucose concentration (mg. percent) of serosal fluid at the end of an experiment
M equals glucose concentration (mg. percent) of mucosal fluid at the end of an experiment
C equals control animal
T equals drug treated animal.

For such usage, the compounds are administered orally as such or admixed with conventional pharmaceutical carriers. They may be administered in such forms as tablets, dispersible powders, granules, capsules, syrups and elixirs, and parenterally as solutions, suspensions, dispersions, emulsion, and the like, e.g., a sterile injectable aqueous suspension. The compositions for oral use may contain one or more conventional adjuvants, such as sweetening agents, flavoring agents, coloring agents and preserving agent, in order to provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastro-intestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan mon-oleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned alone. These pharmaceutical preparations may contain up to about 90% of the active ingredient in combination with the carrier or adjuvant.

Furthermore, the compounds of Formula I may be similarly administered in the form of its non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, nitrate and the like and the organic acid salts, such as the acetate, p-toluenesulfonate, malate and the like.

The dosage of active ingredient employed for the alleviation of obesity and diabetes may vary depending on the particular compound employed and the severity of the condition being treated. However, in general, satisfactory results are obtained when the active compound is administered at a daily dosage of from about 0.15 milligram to about 150 milligrams, preferably 5 milligrams to about 100 milligrams per kilogram of animal body weight, preferably given in divided doses two to four times a day, or in sustained release form. For most large mammals, the total daily dosage is from about 10 to 1000 milligrams, preferably 20 to 500 milligrams. Dosage forms suitable for internal use comprise from about 2.5 to about 500 milligrams, preferably 5 to about 250 milligrams of the active compound in intimate admixture with a solid or liquid pharmaceutically acceptable carrier or diluent.

The preferred pharmaceutical compositions from the standpoint of preparation and ease of administration are solid compositions, particularly hard-filled capsules and tablets containing from about 5 to 100 milligrams of the active ingredient.

EXAMPLE 1

Tablets: Tablets suitable for oral administration which contain the following ingredients may be prepared by conventional tabletting techniques. Such tablets are useful in treating obesity or diabetes at a dose of one tablet 2 to 4 times a day.

| Ingredients: | Weight (mg.) |
|---|---|
| γ-Phenylpropylaminoguanidinehydronitrate | 50 |
| Tragacanth | 10 |
| Lactose | 197.5 |
| Corn starch | 25 |
| Talcum | 15 |
| Magnesium stearate | 2.5 |

EXAMPLE 2

Dry filled capsules: Capsules suitable for oral administration which contain the following ingredients are prepared in a conventional manner. Such capsules are useful in treating obesity or diabetes at a dose of one capsule 2 to 4 times a day.

| Ingredients: | Weight (mg.) |
|---|---|
| γ-Phenylpropylaminoguanidine | 100 |
| Inert solid diluent (starch, lactose, kaolin) | 200 |

EXAMPLE 3

The following formulations for syrups or elixirs containing an effective amount of active compound may be formulated using conventional methods.

|  | Percent by weight | |
|---|---|---|
|  | Syrup | Elixir |
| γ-Phenylpropylaminoguanidine | .5-3.5 | .5-3.5 |
| Buffering system | (¹) | (¹) |
| Sodium benzoate | .1-.5 | .1-.5 |
| Flavoring agent | .01-.2 | .01-.2 |
| Water | 20-40 | 5-20 |
| Simple syrups U.S.P. | 30-70 | 0 |
| Sorbitol solution (70%) | 10-30 | 20-60 |
| Certified dye | .5-2 | .5-2 |
| Alcohol | 0 | 2.5-20 |
| Methyl paraben | 0 | .05-.1 |
| Propyl paraben | 0 | .05-.1 |
| Sodium saccharin | 0 | .01-.08 |

¹ Quantity sufficient to adjust pH.

EXAMPLE 4

Sterile solution for injection: The following ingredients are dissolved in water for injection. The resulting solution is filtered through an appropriate medium to render a clear solution. The solution is then auto-claved to render it sterile.

| Ingredient: | Weight (percent) |
|---|---|
| γ-Phenylpropylaminoguanidine | 10. |
| Sodium alginate | 0.5. |
| Buffer system | As desired. |
| Lecithin | 0.5. |
| Sodium chloride | As desired. |
| Water for injection | To desired volume. |

What is claimed is:

1. A method for treating obesity which comprises orally administering to a mammal in need of said treatment an anti-obesity effective amount of a compound of the formula

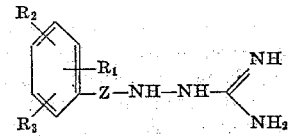

where

Z is —$(CH_2)_n$—, where $n$ is 2, 3, 4 or 5, or
—O—$(CH_2)_m$—, where $m$ is 2, 3 or 4,
$R_1$, $R_2$ or $R_3$ are independently hydrogen, halo having an atomic weight of 19 to 36, lower alkyl having 1 to 4 carbon atoms, lower alkoxy having 1 to 4 carbon atoms, or trifluoromethyl,
provided that there are no adjacent trifluoromethyl groups or the non-toxic acid addition salt thereof.

2. A method according to claim 1 wherein the compound is administered at a daily dose of from about 10 milligrams to about 100 milligrams.

3. A method according to claim 1 wherein the compound is administered in a unit dosage of from about 2.5 milligrams to about 500 milligrams.

4. A method according to claim 1 wherein the compound is γ-phenylpropylaminoguanidine.

5. A method according to claim 1 wherein the compound is in the non-toxic acid addition salt form.

References Cited

UNITED STATES PATENTS

| 3,383,409 | 5/1968 | Bream et al. | 424—326 |
| 3,456,058 | 7/1969 | Schumann | 424—326 |
| 3,474,134 | 10/1969 | Copp et al. | 424—326 |

JEROME D. GOLDBERG, Primary Examiner